UNITED STATES PATENT OFFICE.

FRITZ FUNCKE AND CARL JAGERSPACHER, OF BASEL, SWITZERLAND, ASSIGNORS TO SOCIETY OF CHEMICAL INDUSTRY IN BASLE, OF BASEL, SWITZERLAND.

COPPER COMPOUNDS OF LEUCOTRIARYLMETHANAZO DYESTUFFS AND A PROCESS OF MAKING SAME.

1,237,193.     Specification of Letters Patent.     Patented Aug. 14, 1917.

No Drawing.     Application filed January 5, 1917. Serial No. 140,689.

*To all whom it may concern:*

Be it known, that we, FRITZ FUNCKE and CARL JAGERSPACHER, citizens of the Swiss Republic, and residents of Basel, Switzerland, have invented new and useful Copper Compounds of Leucotriarylmethanazo Dyestuffs and Processes of Making Same, of which the following is a full, clear, and exact specification.

We have found, that the new leucotriarylmethanazo dyestuffs, described in our United States application for Letters Patent Serial No. 140,688 filed January 5, 1917, can be transformed by their treatment with copper compounds, as for instance copper salts, copper oxid, copper hydroxid, in an aqueous medium into new technically valuable copper compounds soluble in water and dyeing animal fibers in an acid bath vivid blue to green tints fast to light, washing and alkali. The new copper compounds constitute blue to blue and green powders, soluble in water with blue to green coloration and in concentrated sulfuric acid with green to red colorations.

The preparation of the new copper compounds is illustrated by the following examples:

Example 1: 35 parts of the dyestuff obtained by combining the diazo derivative of amidoleucopatentblue with betanaphthol are dissolved in 1000 parts tepid water and to the obtained solution is added at 70° C. a solution of 13 parts of crystallized copper sulfate in 50 parts water, whereby the green-blue coloration of the solution turns to blue. The resulting copper compound is precipitated by addition of common salt, isolated by filtration, pressed and dried. It constitutes a blue-black powder, soluble in water with blue and in concentrated sulfuric acid with green coloration. The new copper compound dyes animal fibers in an acid bath blue pure tints very fast to light and to washing.

Example 2: 37 parts of the dyestuff obtained by combining the diazo derivative of amidoleucopatentblue with 1-phenyl-3-methyl-5-pyrazolone are dissolved in 1000 parts water and to the obtained solution is added, at about 80° C., a solution of 13 parts copper sulfate in 50 parts water, whereby the green-yellow coloration of the solution turns to pure green and the new copper compound is simultaneously precipitated. It is isolated by filtration, pressed and dried. It constitutes a black-green powder, dissolving in water to a pure green and in concentrated sulfuric acid to an orange-red solution. It dyes animal fibers in an acid bath pure green tints fast to washing and to light.

Example 3: 35 parts of the dyestuff obtained by combining the diazo derivative of amidoleucopatentblue with acetoacetanilid are dissolved in 800 parts water at 80° C. and to this solution is added a solution of 13 parts copper sulfate in 50 parts water, whereby the yellow-green coloration of the solution turns to green while the formed copper compound is precipitated simultaneously. By addition of common salt the precipitation of the new copper compound is completed and this latter is afterward isolated by filtering, pressing and drying. It constitutes a blue-black powder dissolving in water to green and in concentrated sulfuric acid to brown-red solutions.

It dyes animal fibers in an acid bath very pure green tints of an excellent fastness to light and to washing.

What we claim is:

1. The herein described process for the manufacture of copper compounds of leucotriarylmethanazo dyestuffs, soluble in water, consisting in treating an azo dyestuff derived from a diazo derivative of amido-oxyleucotriarylmethan derivatives with a copper compound in an aqueous medium.

2. As new products the herein described copper compounds of leucotriarylmethanazo dyestuffs, constituting black to blue and green powders, soluble in water with blue to green colorations and in concentrated sulfuric acid with green to red colorations and dyeing animal fibers in an acid bath vivid blue to green tints fast to washing and to light.

3. As a new article of manufacture, the herein described copper compound of the dyestuff derived from the diazo derivative of leucoamidopatentblue and 1-phenyl-3-methyl-5-pyrazolone, which constitutes a black-green powder soluble in water to a pure green solution and in concentrated sulfuric acid to orange-red solutions and dyes animal fibers in an acid bath pure green tints fast to washing and to light.

In witness whereof we have hereunto signed our names this 18th day of December 1916, in the presence of two subscribing witnesses.

Dr. FRITZ FUNCKE.
Dr. CARL JAGERSPACHER.

Witnesses:
LYDIA UEBELE,
AMAND RITTER.